US011003296B2

(12) United States Patent
You et al.

(10) Patent No.: US 11,003,296 B2
(45) Date of Patent: May 11, 2021

(54) TOUCH SENSOR AND DISPLAY DEVICE INCLUDING THE SAME

(71) Applicant: Samsung Display Co., Ltd., Yongin-Si (KR)

(72) Inventors: Chun Gi You, Yongin-si (KR); Tae Ik Kim, Yongin-si (KR); Hyun Sik Park, Yongin-si (KR)

(73) Assignee: Samsung Display Co., Ltd.

( * ) Notice: Subject to any disclaimer, the term of this patent is extended or adjusted under 35 U.S.C. 154(b) by 0 days.

(21) Appl. No.: 16/666,315

(22) Filed: Oct. 28, 2019

(65) Prior Publication Data

US 2020/0341591 A1 Oct. 29, 2020

(30) Foreign Application Priority Data

Apr. 24, 2019 (KR) ........................ 10-2019-0048052

(51) Int. Cl.
*G06F 3/044* (2006.01)
*G06F 3/041* (2006.01)

(52) U.S. Cl.
CPC .......... *G06F 3/0445* (2019.05); *G06F 3/0412* (2013.01); *G06F 3/0446* (2019.05); *G06F 2203/04111* (2013.01); *G06F 2203/04112* (2013.01)

(58) Field of Classification Search
None
See application file for complete search history.

(56) References Cited

U.S. PATENT DOCUMENTS

| 8,922,522 | B2 | 12/2014 | Atsuta et al. |
| 9,137,882 | B2 | 9/2015 | Yoo et al. |
| 2011/0050625 | A1* | 3/2011 | Kim ........................ G06F 3/044 345/174 |
| 2011/0057893 | A1 | 3/2011 | Kim et al. |
| 2012/0098762 | A1* | 4/2012 | Kim ...................... G06F 3/0446 345/173 |
| 2013/0328830 | A1* | 12/2013 | Han ...................... G06F 3/0448 345/174 |

(Continued)

FOREIGN PATENT DOCUMENTS

| KR | 10-1082293 A | 11/2011 |
| KR | 10-2018-0133706 A | 12/2018 |
| KR | 10-1960532 B1 | 3/2019 |

*Primary Examiner* — Dorothy Harris
(74) *Attorney, Agent, or Firm* — Innovation Counsel LLP

(57) ABSTRACT

A touch sensor may include a base layer, a sensing electrode set, a first insulating layer, a first conductive member, and a second insulating layer. The sensing electrode set may be disposed on the base layer, may include a first first-type sensing electrode, and may include a first second-type sensing electrode. The first insulating layer may be disposed on the sensing electrode set, may include a contact hole, and may include a first opening. The first conductive member may be disposed on the first insulating layer and may be directly connected to the first second-type sensing electrode through the contact hole. The second insulating layer may be disposed on the first insulating layer, may cover the first conductive member, and may include a second opening. Each of the first opening and the second opening may partially expose the first first-type sensing electrode or the first second-type sensing electrode.

20 Claims, 9 Drawing Sheets

(56) References Cited

U.S. PATENT DOCUMENTS

| | | | |
|---|---|---|---|
| 2015/0153779 A1* | 6/2015 | Ko | G06F 3/0443 |
| | | | 345/173 |
| 2015/0227235 A1* | 8/2015 | Lee | G06F 3/0448 |
| | | | 345/174 |
| 2018/0321561 A1* | 11/2018 | Huang | G02F 1/136204 |
| 2018/0358413 A1 | 12/2018 | Lee et al. | |
| 2019/0051708 A1* | 2/2019 | Jeong | H01L 51/5281 |

* cited by examiner

TOUCH SENSOR AND DISPLAY DEVICE INCLUDING THE SAME

This application claims priority to and the benefit of Korean Patent Application No. 10-2019-0048052, filed on Apr. 24, 2019; the content of the Korean Patent Application in its entirety is incorporated by reference.

BACKGROUND

1. Field

The technical field relates to a touch sensor and a display device including the touch sensor.

2. Description of the Related Art

A display device may have an information input function in addition to an image display function. In order to perform the information input function, the display device may include a touch sensor for receiving a touch of a user or a touch from a predetermined tool. If components of the touch sensor are damaged because of static electricity and/or corrosion, performance of the display device may be unsatisfactory.

SUMMARY

An embodiment may be related to a touch sensor that is robust against static electricity and/or wiring corrosion.

An embodiment may be related to a display device including the touch sensor.

A touch sensor according to embodiments may include a base layer comprising a sensing region, a sensing electrode disposed on the sensing region of the base layer, a first insulating layer disposed on the sensing electrode, a conductive pattern disposed on the first insulating layer and connected to the sensing electrode through the first insulating layer, and a second insulating layer disposed on the first insulating layer to cover the conductive pattern. Each of the first insulating layer and the second insulating layer may include an opening exposing a part of the sensing electrode.

According to an embodiment, the opening of the first insulating layer and the opening of the second insulating layer may overlap each other.

According to an embodiment, the conductive pattern may be disposed apart from the opening.

According to an embodiment, the sensing electrode may include a transparent conductive material.

According to an embodiment, the conductive pattern may be a single layer or multilayer structure including aluminum.

According to an embodiment, the conductive pattern may be a three layer structure of molybdenum (Mo)/aluminum (Al)/molybdenum (Mo).

According to an embodiment, the conductive pattern may be a four layer structure of a transparent electrode material/molybdenum (Mo)/aluminum (Al)/molybdenum (Mo).

According to an embodiment, the sensing electrode may include a plurality of first sensing cells arranged in a first direction on the base layer, a plurality of second sensing cells arranged in a second direction intersecting the first direction on the base layer, and a first connection pattern electrically connecting the first sensing cells adjacent to each other.

According to an embodiment, the first sensing cells, the second sensing cells, and the first connection pattern may be disposed on the same layer.

According to an embodiment, the conductive pattern may electrically connect the second sensing cells adjacent to each other through a contact hole passing through the first insulating layer.

According to an embodiment, the conductive pattern may include a plurality of second connection patterns electrically connecting two second sensing cells adjacent to each other through a contact hole passing through the first insulation layer.

According to an embodiment, the number of the second connection patterns electrically connecting the two adjacent sensing cells adjacent to each other may be four or more.

A display device according to embodiments may include a display panel including a light emitting element and a sealing layer covering the light emitting element, and a touch sensor disposed on the display panel. The touch sensor may include a sensing electrode disposed on a sensing region of the sealing layer, a first insulating layer disposed on the sensing electrode, a conductive pattern disposed on the first insulating layer and connected to the sensing electrode through the first insulating layer, and a second insulating layer disposed on the first insulating layer to cover the conductive pattern. Each of the first insulating layer and the second insulating layer may include an opening exposing a part of the sensing electrode.

According to an embodiment, the opening of the first insulating layer and the opening of the second insulating layer may overlap each other.

According to an embodiment, the conductive pattern may be disposed apart from the opening.

According to an embodiment, the display device may further include an anti-reflection layer or a window layer disposed on the second insulating layer.

According to an embodiment, an optical transparent adhesive member may be disposed in the opening.

According to an embodiment, the sensing electrode may include a transparent conductive material.

According to an embodiment, the conductive pattern may be a single layer or multilayer structure including aluminum.

An embodiment may be related to a touch sensor. The touch sensor may include a base layer, a sensing electrode set, a first insulating layer, a first conductive member, and a second insulating layer. The sensing electrode set may be disposed on the base layer, may include a first first-type sensing electrode, and may include a first second-type sensing electrode. The first insulating layer may be disposed on the sensing electrode set, may include a contact hole, and may include a first opening. The first conductive member may be disposed on the first insulating layer and may be directly connected to the first second-type sensing electrode through the contact hole. The second insulating layer may be disposed on the first insulating layer, may cover the first conductive member, and may include a second opening. Each of the first opening and the second opening may partially expose the first first-type sensing electrode or the first second-type sensing electrode.

A position of the second opening may overlap a position of the first opening.

The first conductive member may be spaced from each of the first opening and the second opening.

The sensing electrode set may include a transparent conductive material.

The first conductive member may include aluminum.

The first conductive member may include a first molybdenum layer, a second molybdenum layer, and an aluminum layer positioned between the first molybdenum layer and the second molybdenum layer.

The first conductive member may include a transparent electrode material layer overlapping the first molybdenum layer. The transparent electrode material layer may contact with the first molybdenum layer.

The sensing electrode set may include the following elements: a plurality of first-type sensing electrodes arranged in a first direction; a plurality of second-type sensing electrodes arranged in a second direction different from the first direction; and a first connection member electrically connecting at least two of the first-type sensing electrodes.

The first-type sensing electrodes, the second-type sensing electrodes, and the first connection member may directly contact a same face of the base layer.

The first conductive member may electrically connect the first second-type sensing electrode to a second second-type sensing electrode.

A second conductive member may electrically connect the first second-type sensing electrode to the second second-type sensing electrode and may overlap a second first-type sensing electrode. The second first-type sensing electrode may be electrically connected through the first connection member to the first first-type sensing electrode.

A second conductive member may electrically connect the first second-type sensing electrode to the second second-type sensing electrode, may overlap the first first-type sensing electrode, and may be positioned between the first opening and the first conductive member in a plan view.

An embodiment may be related to a display device. The display device may include a display panel and a touch sensor disposed on the display panel. The display panel may include a light emitting element and a sealing layer covering the light emitting element. The touch sensor may include a base layer, a sensing electrode set, a first insulating layer, a first conductive member, and a second insulating layer. The sensing electrode set may be disposed on the base layer, may include a first first-type sensing electrode, and may include a first second-type sensing electrode. The first insulating layer may be disposed on the sensing electrode set, may include a contact hole, and may include a first opening. The first conductive member may be disposed on the first insulating layer and may be directly connected to the first second-type sensing electrode through the contact hole. The second insulating layer may be disposed on the first insulating layer, may cover the first conductive member, and may include a second opening. Each of the first opening and the second opening may partially expose the first first-type sensing electrode or the first second-type sensing electrode.

A position of the second opening may overlap a position of the first opening.

The first conductive member may be spaced from each of the first opening and the second opening.

The display device may include an anti-reflection layer or a window layer disposed on the second insulating layer.

The display device may include a transparent adhesive member disposed in at least one the first opening and the second opening.

The sensing electrode set may include a transparent conductive material.

The first conductive member may include aluminum.

A touch sensor according to embodiments includes a plurality of openings that form a static electricity discharge path, and thus defects such as disconnection in the sensing area due to static electricity inflow may be prevented or reduced. At least a portion of the static electricity may be transferred to a sensing electrode set because of the openings and may be easily discharged through the large size sensing electrode set. Advantageously, the touch sensor and the display device including the touch sensor may be substantially robust against static electricity.

In embodiments, a touch sensor and an associated display device include a connection pattern in which a metal layer overlaps a transparent conductive material, and thus disconnection of wiring due to corrosion may be prevented. Therefore, sufficient reliability of the touch sensor and the display device may be attained.

DETAILED DESCRIPTION

Figure 1:
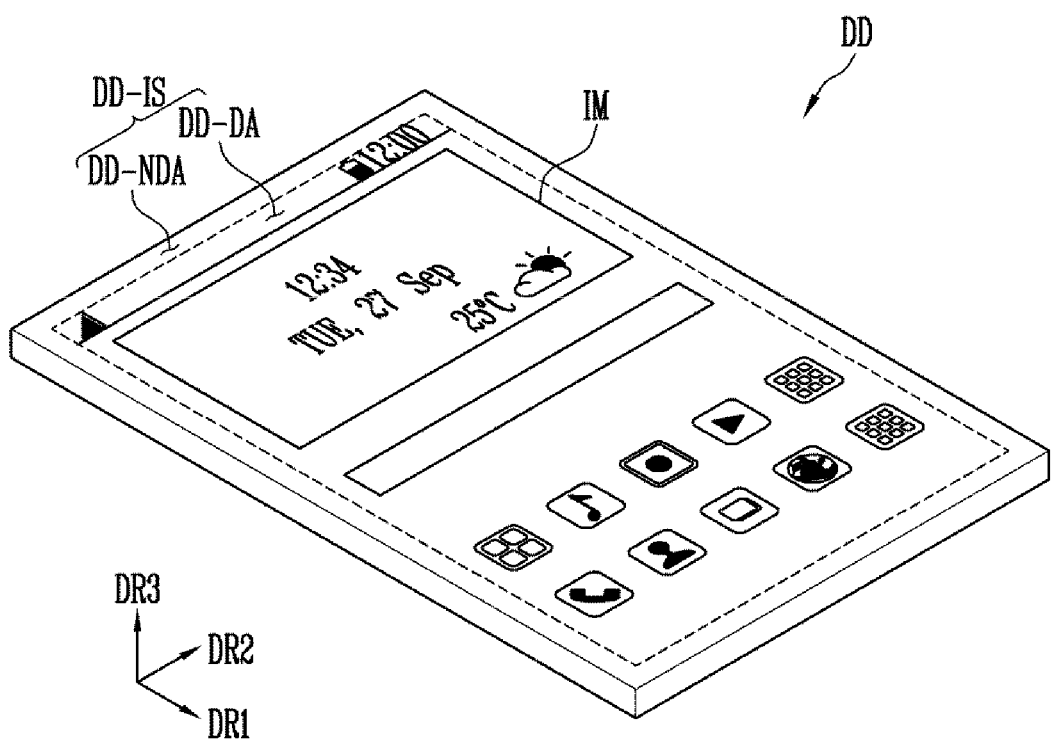
FIG. 1 is a perspective view illustrating a display device according to embodiments.

Example embodiments are described with reference to the accompanying drawings. The same reference numerals are used for the same elements or similar elements in the drawings, and description for the same elements may not be repeated.

Although the terms "first," "second," etc. may be used to describe various elements, these elements should not be limited by these terms. These terms may be used to distinguish one element from another element. A first element may be termed a second element without departing from teachings of one or more embodiments. The description of an element as a "first" element may not require or imply the presence of a second element or other elements. The terms "first," "second," etc. may be used to differentiate different categories or sets of elements. For conciseness, the terms "first," "second," etc. may represent "first-type (or first-set)," "second-type (or second-set)," etc., respectively.

The term "pattern" may mean "member." The term "sensing electrode" may mean "sensing electrode set." The term "sensing cell" may mean "sensing electrode."

FIG. 1 is a perspective view illustrating a display device according to embodiments.

Referring to FIG. 1, the display device DD may display an image IM through a display surface DD-IS. The display surface DD-IS may be parallel to a surface defined by a first direction DR1 and a second direction DR2. A normal direction of the display surface DD-IS, that is, a thickness direction of the display device DD, may be indicated by a third direction DR3.

A front surface (or an upper surface) and a back surface (or a lower surface) of each of members, layers, or units described below may be perpendicular to the third direction DR3. The first to third directions DR1, DR2, and DR3 are examples, and the directions indicated by the first to third directions DR1, DR2, and DR3 may be relative concepts and may represent different directions.

The display device DD shown in FIG. 1 may have a planar display surface. The display device DD may have one or more of various types of display surfaces, such as a curved display surface or a stereoscopic display surface. When the display device DD has the stereoscopic display surface, the stereoscopic display surface may include a plurality of display areas oriented in different directions. The stereoscopic display surface may be implemented as a polygonal columnar display surface.

The display device DD may be a flexible display device. For example, the display device DD may be one of a foldable display device, a bendable display device, a rollable display device, and the like. The display device DD may be a rigid display device.

As shown in FIG. 1, the display surface DD-IS of the display device DD may include a display area DD-DA in which the image IM is displayed and may include a non-display area DD-NDA adjacent to the display area DD-DA. The display panel may include light emitting elements in the display area DD-DA. The non-display area DD-NDA may not dynamically display different images. The non-display area DD-NDA may be disposed outside the display area DD-DA.

Figure 2A:
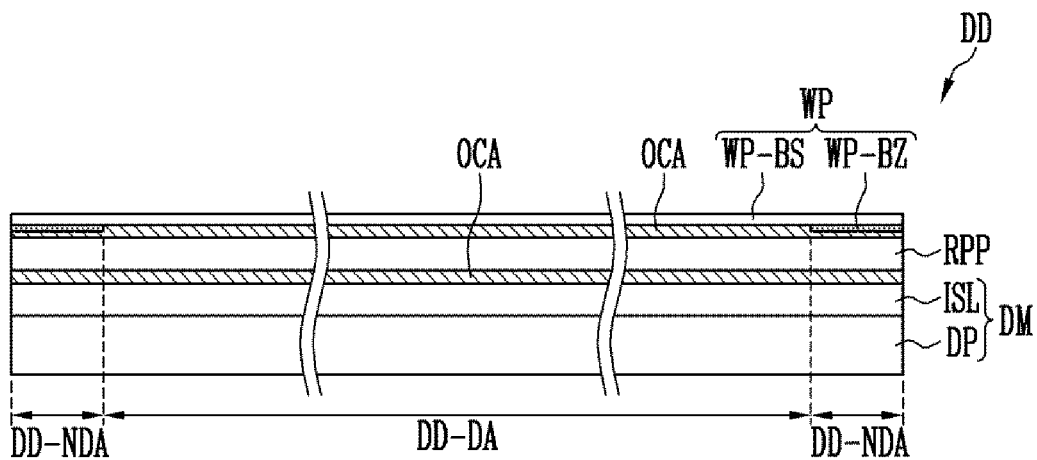
FIG. 2A, FIG. 2B, and FIG. 2C are cross-sectional views schematically illustrating one or more display devices according to embodiments.
Figure 2B:
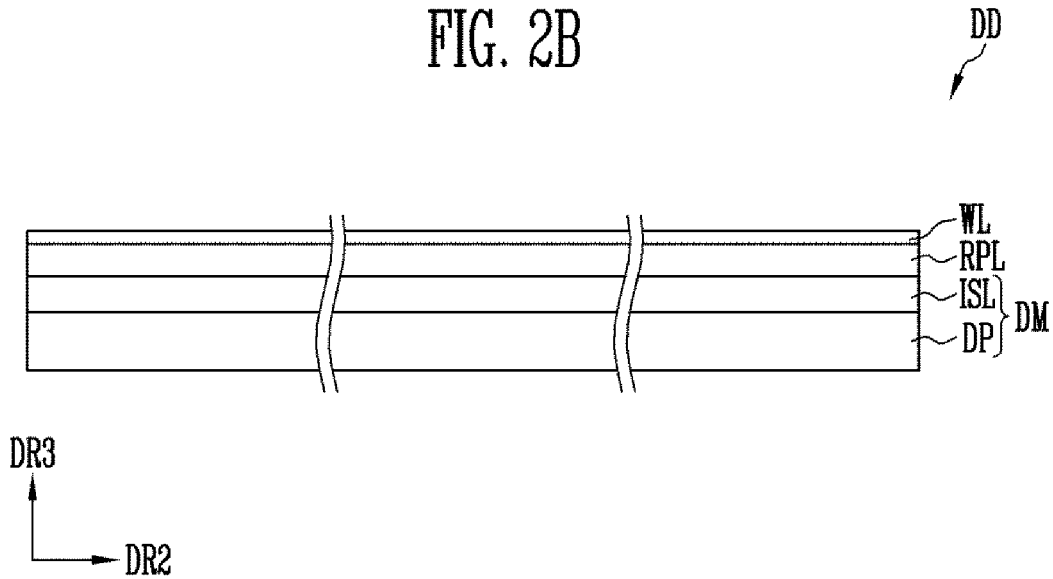
Figure 2C:
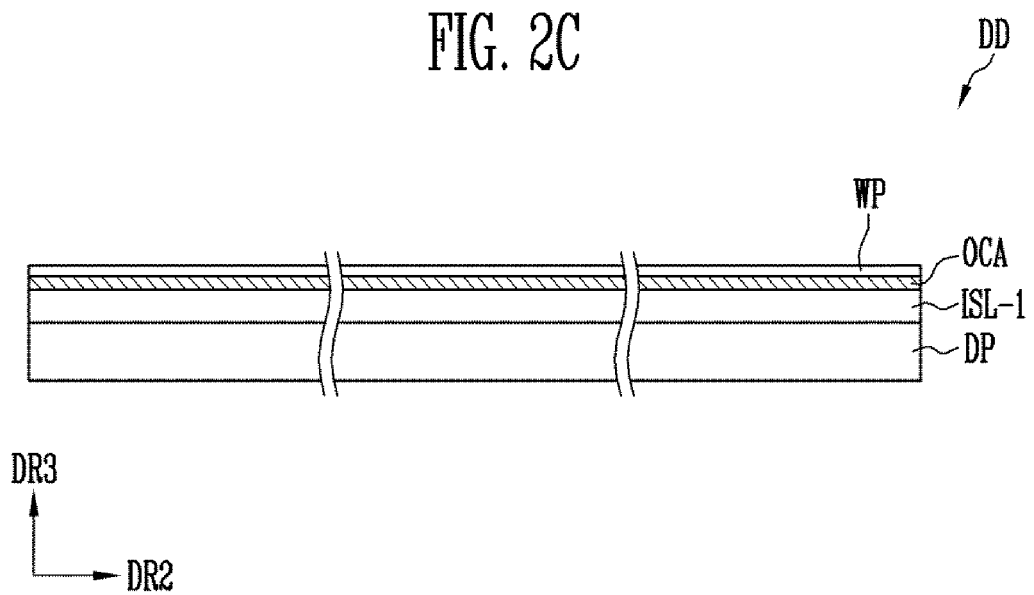

FIGS. 2A to 2C are cross-sectional views schematically illustrating one or more display devices according to embodiments.

Referring to FIGS. 2A to 2C, the display device DD may include a display panel DP, one or more input sensing unit ISL and/or ISL-1 (for example, a touch sensor), and one or more window units WL and/or WP. The display device DD may further include an anti-reflection unit.

Some of the components ISL, ISL-1, WL, and WP may parts of a continuous structure, and/or some components may be combined with each other through an adhesive member. The adhesive member may be/include an optical transparent adhesive member OCA.

The display panel DP may include a base layer, a circuit element, a display element, and a sealing layer.

The circuit element may be disposed on the base layer and may include a signal line, a pixel driving circuit, and the like.

The display element may include a pixel definition layer and a light emitting diode. The display element may be disposed on the circuit element and may be electrically connected to the circuit element. The light emitting diode may be an organic light emitting diode or an inorganic light emitting diode.

The sealing layer may cover and seal the display element. The sealing layer may include at least one organic film and at least one inorganic film. The sealing layer may be a base layer (e.g., indicated as BL in FIG. 3) of the input sensing units ISL and ISL-1.

The input sensing units ISL and ISL-1 may sense a touch or an input provided by an external medium such as a hand or a pen to the display surface DD-IS of the display device DD.

In FIGS. 2A to 2C, a structure formed through a continuous process may be referred to as a "layer". A structure including a layer combined with another layer may be referred to as a "panel".

The input sensing units ISL and ISL-1 and the window units WL and WP may be referred to as an input sensing panel, a window panel WP, an input sensing layer ISL, or a window layer WL according to presence or absence of the base layer.

In an embodiment, as shown in FIG. 2A, the display device DD may include a display panel DP, an input sensing layer ISL, an anti-reflection panel RPP, and a window panel WP.

The input sensing layer ISL may be disposed directly on the display panel DP. In the present specification, "a structure B is disposed directly on a structure A" may mean that no separate adhesive layer or adhesion member is disposed between the structure A and the structure B. The structure B may be formed through a continuous process on a base surface provided by the structure A after the structure A is formed.

A display module DM may include the display panel DP and the input sensing layer ISL disposed on the display panel DP. Optical transparent adhesive members OCA may be disposed between the display module DM and the anti-reflection panel RPP, and between the anti-reflection panel RPP and the window panel WP.

The input sensing layer ISL may be disposed in the display panel DP or on the display panel DP.

The display panel DP may be a light emitting display panel. For example, the display panel DP may be an organic light emitting display panel or a quantum dot light emitting display panel.

The anti-reflection panel RPP reduces reflection of external light incident from an upper side of the window panel WP. The anti-reflection panel RPP may include a phase retarder and a polarizer. A phase retarder may be of a film type or a liquid crystal coating type, and may include a λ/2 phase retarder and/or a λ/4 phase retarder. The polarizer may also be of a film type or a liquid crystal coating type.

The anti-reflection panel RPP may include color filters. The color filters have a predetermined arrangement. The arrangement of the color filters may be determined in consideration of light emission colors of the pixels included in the display panel DP. The anti-reflection panel RPP may further include a black matrix adjacent to the color filters.

The window panel WP may include a base film WP-BS and a light blocking pattern WP-BZ. The base film WP-BS may include a glass substrate, a synthetic resin film, and/or the like. The base film WP-BS may be a single layer. The base film WP-BS may include two or more films combined with an adhesive member.

The light blocking pattern WP-BZ partially overlaps the base film WP-BS. The light blocking pattern WP-BZ may be disposed on a back surface of the base film WP-BS to define a bezel area of the display device DD, that is, the non-display area DD-NDA (refer to FIG. 1).

The window panel WP may further include a functional coating layer disposed on an upper surface of the base film WP-BS. The functional coating layer may include at least one of a fingerprint prevention layer, an anti-reflection layer, and a hard coating layer.

As shown in FIG. 2B, the display device DD may include a display panel DP, an input sensing layer ISL, an anti-reflection layer RPL, and a window layer WL. An adhesive member may be optional or unnecessary for the display device DD, and the input sensing layer ISL, the anti-reflection layer RPL, and the window layer WL may be formed in a continuous process on the display panel DP. The stack order of the input sensing layer ISL and the anti-reflection layer RPL may be changed.

As shown in FIG. 2C, the display device DD may not include a separate anti-reflection unit. The display device DD may include a display panel DP, an input sensing layer ISL-1, and a window panel WP. The input sensing layer ISL-1 may further have an anti-reflection function.

The input sensing unit may entirely overlap the display panel. The input sensing unit may partially overlap the display area DD-DA, or may overlap only the non-display area DD-NDA. The input sensing unit may be a touch sensing panel that senses a touch of a user, or a fingerprint sensing panel that senses fingerprint information of a finger of the user. A pitch of the sensing electrodes and widths of the sensing electrodes described below may be configured according to embodiments.

Figure 3:
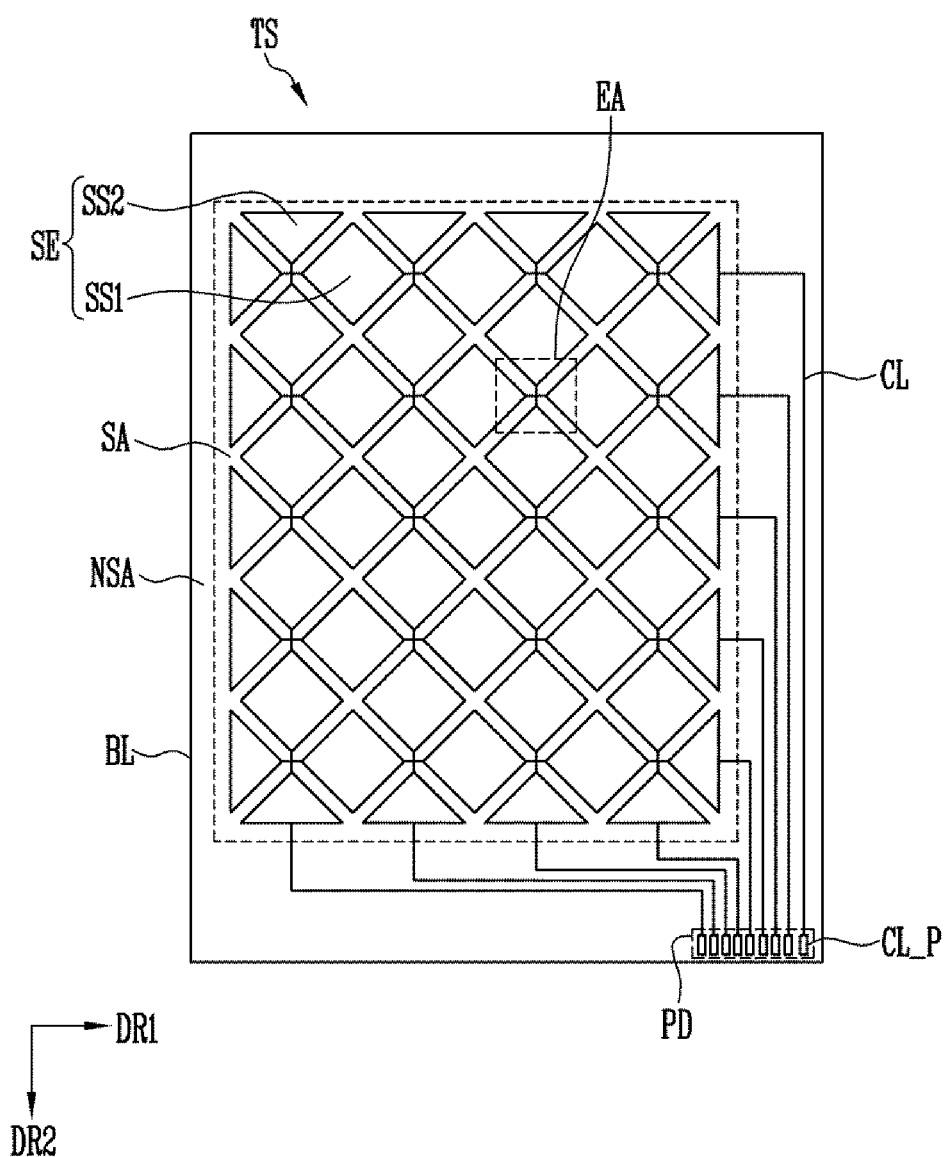
FIG. 3 is a plan view illustrating a touch sensor according to embodiments.

FIG. 3 is a plan view illustrating a touch sensor according to embodiments.

Referring to FIG. 3, the touch sensor TS may include a base layer BL, a sensing electrode SE, and a signal line CL. The touch sensor TS may further include a pad portion PD connected to the signal line CL.

The base layer BL may be formed of a transparent insulating material, such as glass, quartz, ceramic, or plastic. The base layer BL may be a flexible substrate when the base layer BL is formed of plastic. For example, the base layer BL may be formed of an organic material selected from a group consisting of polyethersulphone (PES), polyacrylate (PAR), polyetherimide (PEI), polyethyelene naphthalate (PEN), polyethylene terephthalate (PET), polyphenylene sulfide (PPS), polyallylate, polyimide, polycarbonate (PC), cellulose triacetate (SAC), and cellulose acetate propionate (CAP).

The base layer BL may be an inorganic material. For example, the base layer BL may correspond to the sealing layer or the uppermost layer of the sealing layer of a display panel (DP of FIG. 1). In this case, the base layer BL may include a silicon nitride layer, a silicon oxynitride layer, a silicon oxide layer, a titanium oxide layer, and/or an aluminum oxide layer.

The base layer BL may include a sensing area SA that recognizes the touch of the user and a non-sensing area NSA that does not recognize the touch of the user. The sensing area SA and the non-sensing area NSA may have a rectangular shape or a different shape.

The sensing area SA may overlap the display area of a display panel (not shown) disposed on the base layer BL. For example, the sensing area SA may have the same shape as the display area. The non-sensing area NSA may overlap the non-display area of the display panel.

The sensing area SA may be provided with a plurality of sensing electrodes SE and the non-sensing area NSA may be provided with the pad portion PD and the signal lines CL that connect the sensing electrodes SE to the pad portion PD. The pad portion PD may include a plurality of pads CL_P. Each of the pads CL_P may be electrically connected to corresponding sensing electrodes SE through a corresponding signal line CL.

The sensing electrodes SE may include first sensing cells SS1. First sensing cells SS1 aligned in the first direction DR1 may be electrically connected with each other. For example, the first sensing cells SS1 may form a plurality of sensing electrode lines extending in the first direction DR1.

The sensing electrode SE may include second sensing cells SS2. Second sensing cells SS2 may be electrically connected with each other in the second direction DR2. For example, the second sensing cells SS2 may form a plurality of sensing electrode lines extending in the second direction DR2.

First sensing cells SS1 aligned in the first direction DR1 may be integrally formed, or adjacent first sensing cells SS1 may be electrically connected with each other through a connection pattern. Second sensing cells SS2 aligned in the second direction DR2 may be integrally formed, or adjacent second sensing cells SS2 may be electrically connected with each other through a connection pattern.

Each of the sensing cells SS1 and SS2 may have a rhombus shape and/or one or more different polygonal shapes.

The sensing cells SS1 and SS2 and connection members may form a mesh structure with intersections. In this case, an aperture ratio and a transmittance of the display device may not be significantly reduced by the sensing electrode SE.

The sensing electrode rows including the first sensing cells SS1 and the sensing electrode columns including the second sensing cell SS2 may be connected to different pads CL_P through different signal lines CL. One of the sensing electrode row and the sensing electrode column may receive a driving signal for touch sensing through a signal line CL, and the other may transmit a touch sensing signal through another signal line CL.

The pad portion PD may be connected to an external driving circuit (not shown) such as a position detection circuit, and the sensing electrodes SE may be electrically connected to the external driving circuit.

Figure 4:
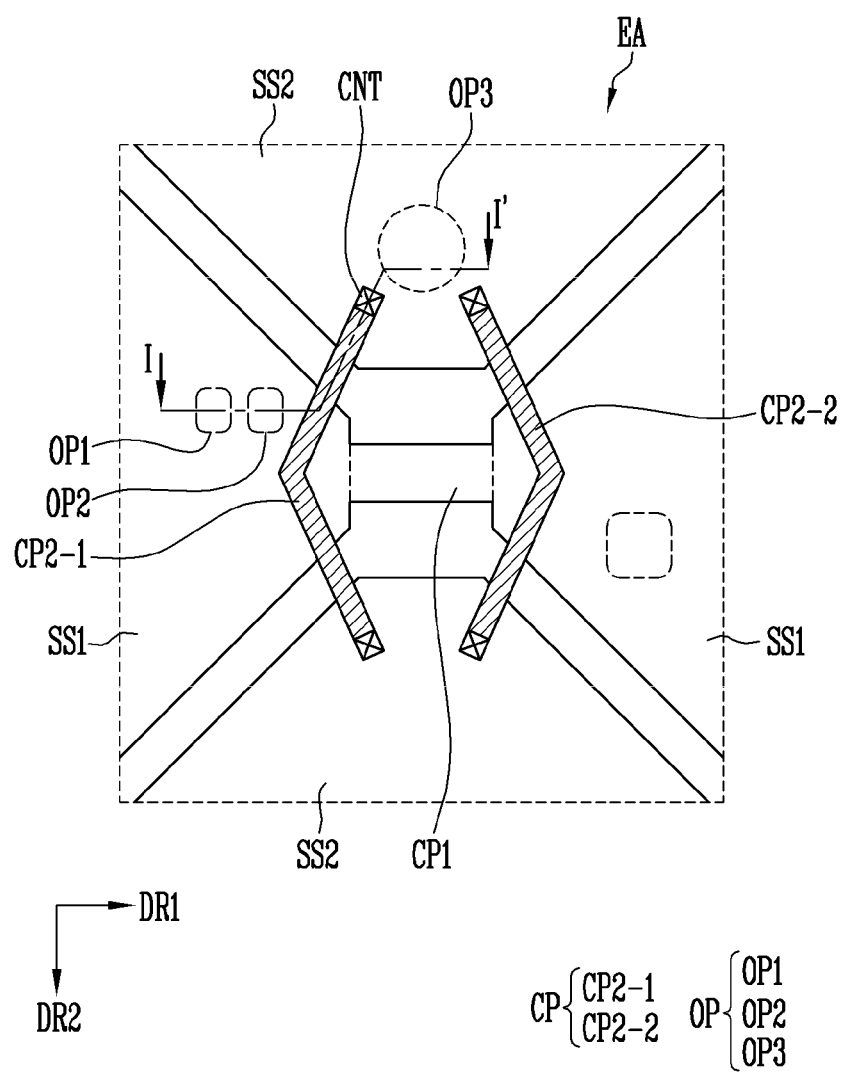
FIG. 4 is an enlarged view illustrating a portion EA of the touch sensor of FIG. 3 according to embodiments.
Figure 5:
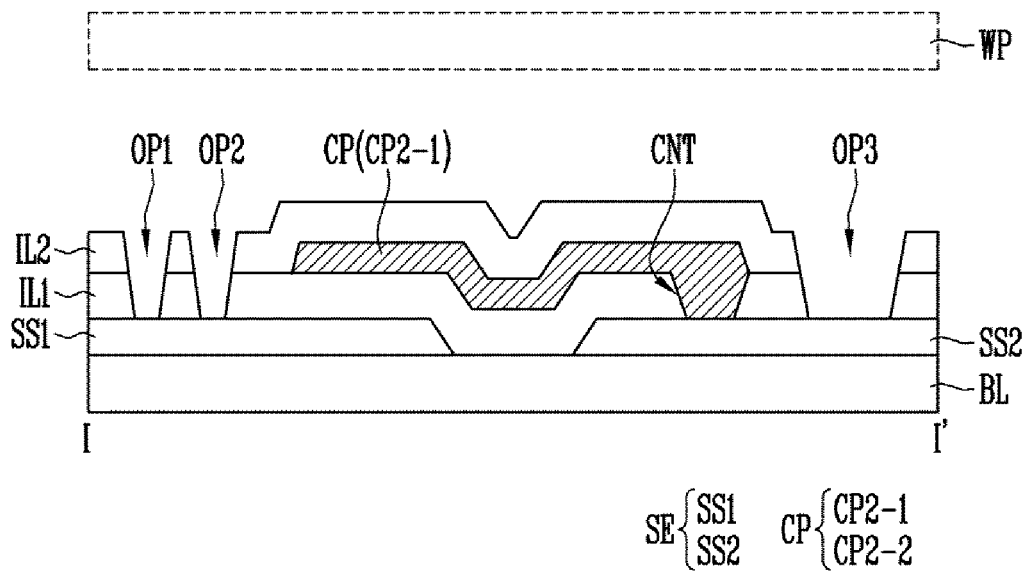
FIG. 5 is a cross-sectional view at a portion I-I' indicated in FIG. 4 according to embodiments.

FIG. 4 is an enlarged view illustrating a portion EA of the touch sensor of FIG. 3 according to embodiments, and FIG. 5 is a cross-sectional view at a portion I-I' indicated in FIG. 4 according to embodiments.

Referring to FIGS. 3 to 5, the touch sensor TS may include conductive layers disposed with an intervening insulating layer. The conductive layers may include the sensing electrode SE, and a conductive pattern CP.

The sensing electrode SE (or sensing electrode set SE) may include the first and second sensing cells SS1 and SS2 disposed on the base layer BL. The first sensing cells SS1 adjacent to each other along/in the first direction DR1 may be connected with each other through a first connection pattern CP1, and the second sensing cells SS1 adjacent to each other along/in the second direction DR2 may be connected with each other through second connection patterns CP2-1 and CP2-2.

The conductive pattern CP including the second connection patterns CP2-1 and CP2-2 may be disposed in a layer different from the first connection pattern CP1. For example, the first connection pattern CP1 may be disposed in the same layer as the first sensing cells SS1 and the second sensing cells SS2, and the conductive pattern CP may be disposed in a layer different from the layer of the first connection pattern CP1, the first sensing cells SS1, and the second sensing cells SS2. Therefore, the first sensing cells SS1 and the second sensing cells SS2 are not short-circuited with each other. For example, the conductive pattern CP may be insulated from the first connection pattern CP1, the first sensing cell SS1, and the second sensing cell SS2 by an insulating layer.

The conductive pattern CP may be disposed in the same layer as the first sensing cells SS1 and the second sensing cells SS2, and the first connection pattern CP1 may be insulated from the first sensing cell SS1 and the second sensing cell SS2 by an insulating layer.

The display panel may be disposed under the touch sensor TS.

The base layer BL may be the uppermost layer of the sealing layer of the display panel. For example, the base layer BL may be an inorganic layer (or an inorganic insulating layer) that is the uppermost layer of the sealing layer. The base layer BL may be an inorganic layer (inorganic buffer layer) additionally disposed on the sealing layer. For example, the base layer BL may include a silicon nitride layer, a silicon oxynitride layer, a silicon oxide layer, a titanium oxide layer, or an aluminum oxide layer.

The sensing electrode SE (including the sensing cells SS1 and SS2) and the first connection pattern CP1 may be disposed on the base layer BL. The sensing cells SS1 and SS2 and the first connection pattern CP1 may be formed by patterning using a mask after a first conductive layer is applied on the base layer BL.

The first connection pattern CP1 may be a part of the first sensing cells SS1, and the first connection pattern CP1 and the first sensing cell SS1 may be integrally formed.

The second sensing cell SS2 may be spaced from the first sensing cell SS1 and the first connection pattern CP1.

The sensing cells SS1 and SS2 and the first connection pattern CP1 may include a transparent conductive material. The sensing cells SS1 and SS2 and the first connection pattern CP1 may include transparent conductive oxide such as indium tin oxide (ITO), indium zinc oxide (IZO), zinc oxide (ZnO), and/or indium tin zinc oxide (ITZO). The transparent conductive material may include conductive polymers such as PEDOT, metal nanowires, and/or graphene.

The conductive layer including the sensing electrode SE may occupy most of the sensing area SA of the touch sensor TS.

A first insulating layer IL1 may be disposed on the base layer BL to substantially cover the sensing cells SS1 and SS2 and the first connection pattern CP1. The first insulating layer IL1 may include at least one of an organic insulating layer including an organic material and an inorganic insulating layer including an inorganic material. For example, the first insulating layer IL1 may include at least one of silicon oxide, silicon nitride, and silicon oxynitride. The first insulating layer IL1 may have a single layer or multilayer structure.

The first insulating layer IL1 may prevent a short circuit (or electrical connection) between the first sensing cell SS1 and the second sensing cell SS2.

The first insulating layer IL1 may include openings OP partially exposing the sensing electrode SE. The openings OP may expose at least a part of the first sensing cell SS1 and the second sensing cell SS2. A plurality of openings (for example, OP1 and OP2) may partially expose one sensing cell.

A contact hole CNT for connection between a second sensing cell SS2 and a conductive pattern CP may be formed in the first insulating layer IL1. A part of the second sensing cell SS2 may be exposed by the contact hole CNT. The contact hole CNT and the opening OP may be located at different portions of the first insulating layer IL1.

The contact hole CNT may be formed by etching a part of the first insulating layer IL1 after the first insulating layer IL1 is deposited.

The conductive pattern CP may be disposed on the first insulating layer IL1. A part of the conductive pattern CP may be directly connected to the second sensing cell SS2 through the contact hole CNT. The conductive pattern CP may electrically connect two adjacent second sensing cells SS2 to each other. The conductive pattern CP may include second connection patterns CP2-1 and CP2-2 (or a bridge). The conductive pattern CP may be spaced from the openings OP.

The second connection patterns CP2-1 and CP2-2 may connect adjacent two second sensing cells SS2 to each other.

In FIG. 4, the second connection patterns CP2-1 and CP2-2 may not overlap the first connection pattern CP1. The second connection patterns CP2-1 and CP2-2 may partially overlap the first connection pattern CP1.

The conductive pattern CP may include an opaque metal. The conductive pattern CP may be a single layer or multi-layer structure including aluminum. For example, the conductive pattern CP may be a three layer structure including a first molybdenum (Mo), layer, an intermediate aluminum (Al) layer, and a second molybdenum (Mo) layer. The conductive pattern CP may be a three layer structure including a first titanium (Ti) layer, an intermediate aluminum (Al) layer, and a second titanium (Ti) layer.

The connection pattern CP may be formed by patterning after the metals are deposited on the first insulating layer IL1. The contact hole CNT may be filled with a material included in the conductive pattern CP.

The second insulating layer IL2 may be disposed on the first insulating layer IL1 to cover the conductive pattern CP. The second insulation layer IL2 prevents the conductive pattern CP, which is a metal material, from being exposed, thereby preventing corrosion and contamination of the conductive pattern CP. The second insulating layer IL2 may include at least one of an organic insulating layer and an inorganic insulating layer.

The second insulating layer IL2 may also include openings OP partially exposing the sensing electrode SE. The openings OP of the second insulating layer IL2 may correspond to and overlap the openings OP of the first insulating layer IL1.

A plurality of openings OP1, OP2, and OP3 may be formed by simultaneously patterning the insulating layers IL1 and IL2 after depositing the second insulating layer IL2. Shapes, areas, and the number of the opening OP may be configured according to embodiments.

As shown in FIG. 5, the window panel WP (or the window unit) may be disposed on the touch sensor TS (including the sensing electrode SE, the insulating layers IL1 and IL2, and the conductive pattern CP).

An optical transparent adhesive material for bonding the window panel WP and the touch sensor TS may be disposed in the openings OP. The opening OP may be filled with an air layer and/or a material having low conductivity.

The conductive pattern CP (which occupies only a very small portion of the sensing area SA) is disposed closer to the window panel WP than the sensing electrode SE.

Static electricity may be generated by an external factor, and the static electricity may flow into the sensing area SA of the touch sensor TS. The static electricity may be concentrated at a nearest conductive pattern CP. The second connection patterns CP2-1 and CP2-2 having a very small size may not completely receive the static electricity. If not effectively discharged, the static electricity may affect the performance and/or structure of the touch sensor TS. For example, when the static electricity is generated, the insulating layers IL1 and IL2 may be deformed by heat due to the static electricity, and thus the second connection patterns CP2-1 and CP2-2 may be disconnected.

The plurality of openings OP1, OP2, and OP3 may form a static electricity discharge path, and thus defects such as the disconnection in the sensing area SA due to the static electricity inflow may be reduced or prevented. At least some of the static electricity may be transferred to the sensing electrode SE of a large area through the plurality of openings OP1, OP2, and OP3, and may be easily discharged through the sensing electrode SE. Thus, the touch sensor TS may be substantially robust against static electricity.

Static electricity with an instantaneous very large voltage may be transferred to the large area sensing electrode SE through the openings OP1, OP2, and OP3, regardless of the conductivity of the material filling the opening. Static electricity may be easily discharged through the electrostatic path formed with the sensing electrode SE.

Figure 6:
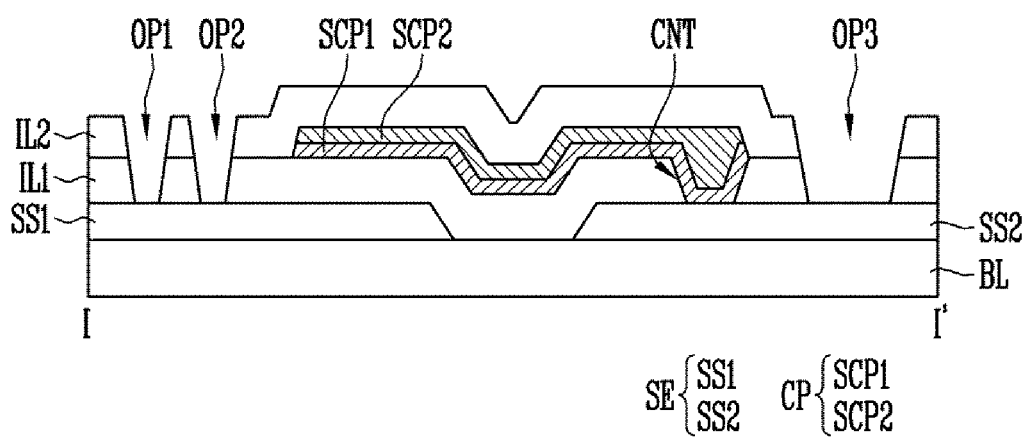
FIG. 6 is a cross-sectional view at the portion I-I' indicated in FIG. 4 according to an embodiment.

FIG. 6 is a cross-sectional view at the portion I-I' indicated in FIG. 4 according to embodiments.

In FIG. 6, the same reference numerals are used for the same or similar elements described with reference to FIG. 5, and description of these elements may not be repeated. The touch sensor of FIG. 6 may have substantially the same or similar structure as the touch sensor of FIG. 5, except for a structure of the second connection pattern.

The conductive pattern CP may include a plurality of conductive layers. The conductive pattern CP may include a first conductive layer SCP1 including a transparent conductive material and may include a second conductive layer SCP2 including an opaque metal material.

The first conductive layer SCP1 may be disposed directly on the first insulating layer IL1. The first conductive layer SCP1 may be in direct contact with the second sensing cell SS2. The first conductive layer SCP1 may include a transparent conductive oxide such as ITO, IZO, ZnO, and/or ITZO.

The second conductive layer SCP2 may be disposed on the first conductive layer SCP1. The second conductive layer SCP2 may include a metal material having a high conductivity. For example, the second conductive layer SCP2 may have a three layer structure including molybdenum (Mo), aluminum (Al), and molybdenum (Mo). Therefore, the second connection patterns CP2-1 and CP2-2 may be a four layer structure including a transparent electrode material layer, a first molybdenum (Mo) layer, an aluminum (Al) layer, and a second molybdenum (Mo) that are sequentially stacked.

Advantageously, the second connection patterns CP2-1 and CP2-2 may be robust against corrosion, and reliability of the touch sensor TS may be improved.

Figure 7:
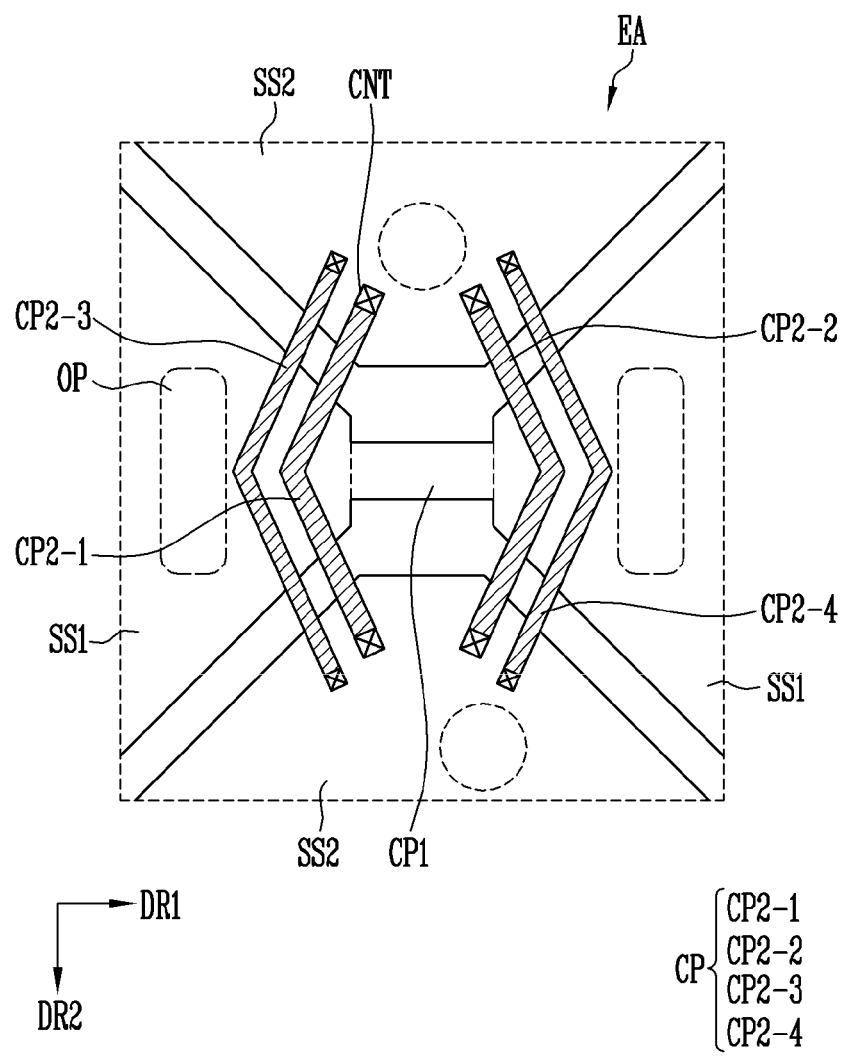
FIG. 7 is an enlarged view illustrating the portion EA of the touch sensor of FIG. 3 according to embodiments.

FIG. 7 is an enlarged view illustrating the portion EA of the touch sensor of FIG. 3 according to embodiments.

In FIG. 7, the same reference numerals are used for the same or similar elements described with reference to FIG. 4, and description of these elements may not be repeated. The touch sensor of FIG. 7 may have substantially the same or similar structure as the touch sensor of FIG. 5, except for the structure of the second connection pattern.

As shown in FIG. 7, a plurality of second connection patterns CP2-1 to CP2-4 may be connected to the second sensing cells SS2 adjacent to each other.

In an embodiment, four or more second connection patterns CP2-1 to CP2-4 may connect the adjacent second sensing cells SS2 to each other. The openings OP may be spaced from the second connection patterns CP2-1 to CP2-4.

As the number of the second connection patterns CP2-1 to CP2-4 increase, the static electricity discharge path through the sensing electrode SE may increase. Therefore, the touch sensor TS may be substantially robust against static electricity.

Figure 8:
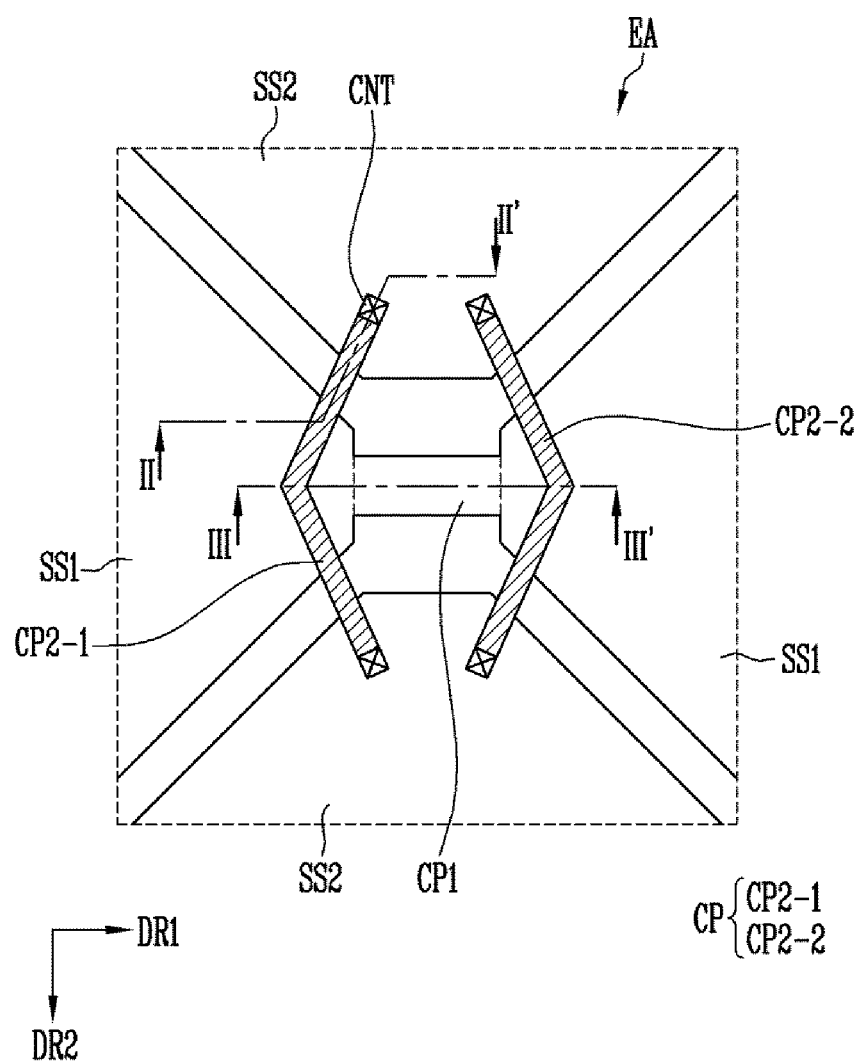
FIG. 8 is an enlarged view illustrating the portion EA of the touch sensor of FIG. 3 according to embodiments.
Figure 9A:
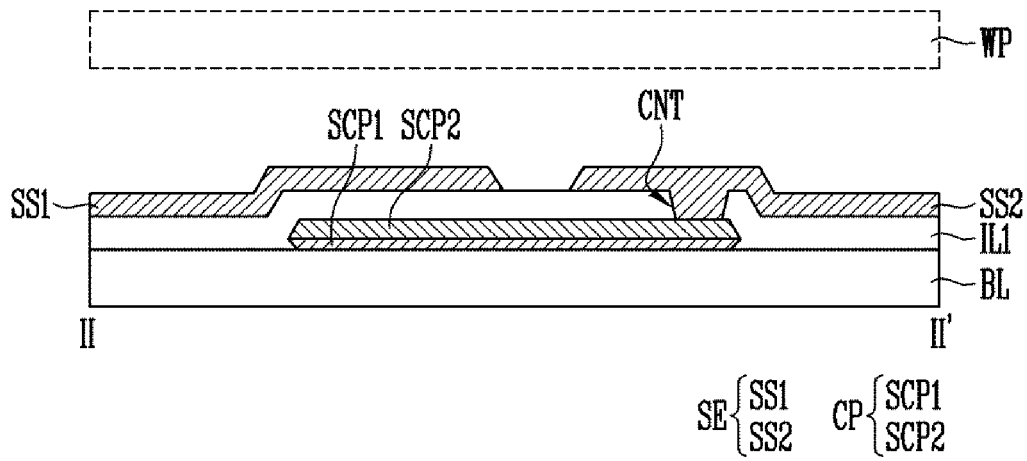
FIG. 9A is a cross-sectional view at a portion II-II' indicated in FIG. 8 according to embodiments.
Figure 9B:
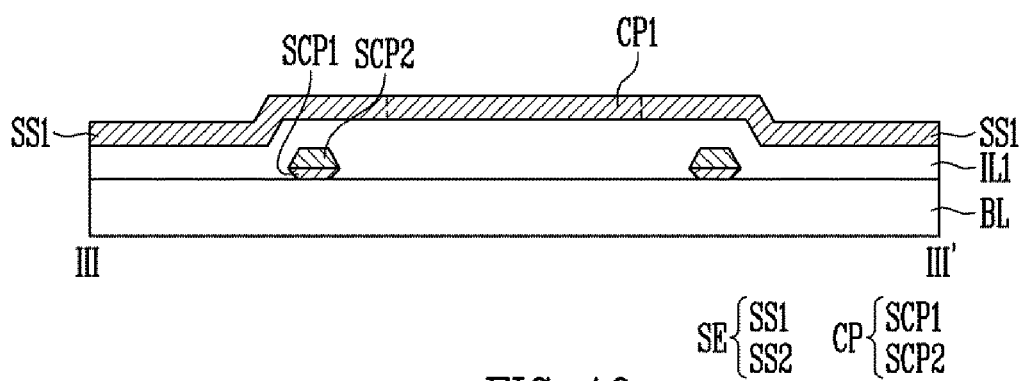
FIG. 9B is a cross-sectional view at a portion III-III' indicated in FIG. 8 according to embodiments.

FIG. 8 is an enlarged view illustrating the portion EA of the touch sensor of FIG. 3 according to embodiments, FIG. 9A is a cross-sectional view at a portion II-II' indicated in FIG. 8 according to embodiments, and FIG. 9B is a cross-sectional view at a portion III-III' indicated in FIG. 8 according to embodiments.

In FIGS. 8 to 9B, the same reference numerals are used for the same or similar elements described with reference to FIGS. 4 and 5, and description of these elements may not be repeated. The touch sensor of FIGS. 8 to 9B may have substantially the same or similar structure as the touch sensor of FIG. 4, except for structural relations of the sensing electrode and the second connection pattern.

The conductive pattern CP including the second connection patterns CP2-1 and CP2-2 may be disposed on the base layer BL. The conductive pattern CP may include the first conductive layer SCP1 including a transparent conductive material and may include the second conductive layer SCP2 including an opaque metal material.

The first conductive layer SCP1 may be disposed directly on the base layer BL. The first conductive layer SCP1 may include a transparent conductive oxide such as ITO, IZO, ZnO, and/or ITZO.

The second conductive layer SCP2 may be disposed on the first conductive layer SCP1. The second conductive layer SCP2 may include a metal material having a high conductivity. For example, the second conductive layer SCP2 may be a three layer structure including molybdenum (Mo, aluminum (Al), and molybdenum (Mo) layers.

A transparent conductive material is robust against corrosion, and thus disconnection of the second connection patterns CP2-1 and CP2-2 due to corrosion and scratch of the second conductive layer SCP2 may be prevented.

After material layers for the conductive layers SCP1 and SCP2 are sequentially stacked, the conductive layers SCP1 and SCP2 may be simultaneously formed through patterning (or etching) the material layers. In an embodiment, when the conductive pattern CP is patterned, a side surface of the first conductive layer SCP1 may have an under-cut structure with respect to the second conductive layer SCP2 so that residues and/or byproducts of the conductive materials are not left beyond the second connection patterns CP2-1 and CP2-2. Therefore, the reliability of the touch sensor TS may be optimized.

For example, the first conductive layer SCP1 may have a reverse tapered structure, and the second conductive layer SCP2 may have a tapered structure.

The first insulating layer IL1 may be disposed on the base layer BL to cover the second connection patterns CP2-1 and CP2-2. The first insulating layer IL1 may include a contact hole CNT exposing a part of the second connection patterns CP2-1 and CP2-2.

The sensing electrode SE including the sensing cells SS1 and SS2 may be disposed on the first insulating layer IL1. The sensing electrode SE may further include the first connection pattern CP1 connecting the first sensing cells SS1 with each other.

The second sensing cell SS2 may be connected to the second connection patterns CP2-1 and CP2-2 through contact holes CNT.

The window panel WP may be disposed on the sensing electrode SE. The touch sensor TS may be formed by a three-mask process for forming the conductive pattern CP, the first insulating layer IL1, and the sensing electrode SE. Thus, a manufacturing process of the touch sensor TS may be simplified and a manufacturing cost may be reduced.

Since the second connection patterns CP2-1 and CP2-2 include the transparent electrode material overlapping the metal material, corrosion of the second connection patterns CP2-1 and CP2-2 may be prevented, and the disconnection of the second connection patterns CP2-1 and CP2-2 may be prevented. Therefore, the reliability of the touch sensor TS may be improved.

Figure 10:
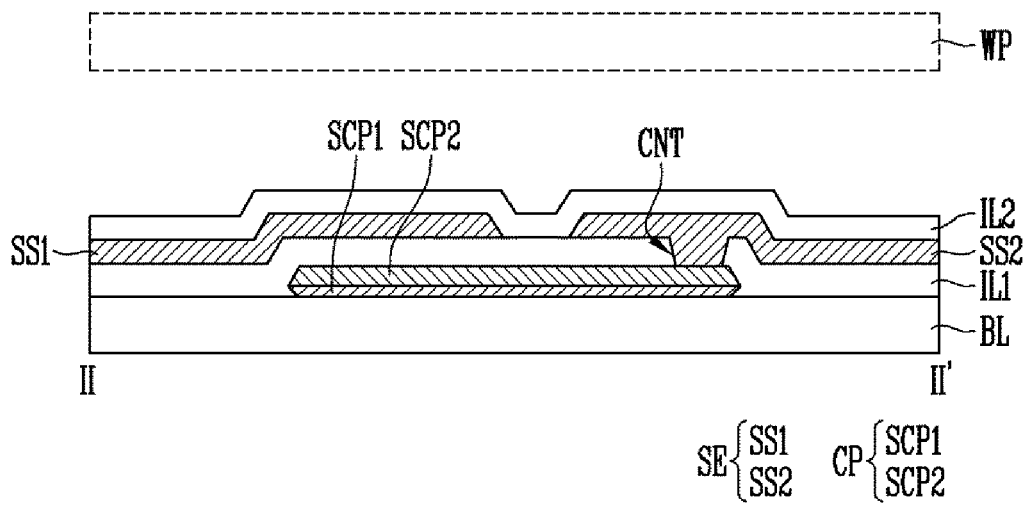
FIG. 10 is a cross-sectional view at the portion II-II' indicated in FIG. 8 according to embodiments.

FIG. 10 is a cross-sectional view at a portion II-II' indicated in FIG. 8 according to embodiments.

In FIG. 10, the same reference numerals are used for the same or similar elements described with reference to FIGS. 9A and 9B, and description of these elements may not be repeated. The touch sensor of FIG. 10 may have substantially the same or similar structure as the touch sensor of FIGS. 9A and 9B except for the second insulating layer.

The second insulating layer IL2 may cover the sensing electrode SE on the first insulating layer IL1. Therefore, the sensing electrode SE, which is configured of a transparent conductive material, may be protected from external contamination, impact, and the like. Thus, driving stability and reliability of the touch sensor TS may be improved.

Embodiments are described as illustrative examples. Practical embodiment may be applied to various other combinations and modifications within the scope of the appended claims.

What is claimed is:

1. A touch sensor comprising:
   a base layer;
   a sensing electrode set disposed on a face of the base layer, comprising a first first-type sensing electrode, and comprising a first second-type sensing electrode;
   a first insulating layer disposed on the sensing electrode set, including a contact hole, and including a first opening;
   a first conductive member disposed on the first insulating layer and directly connected to the first second-type sensing electrode through the contact hole; and
   a second insulating layer disposed on the first insulating layer, covering the first conductive member, and including a second opening,
   wherein the first conductive member is disposed between the first insulating layer and the second insulating layer in a direction perpendicular to the face of the base layer, and
   wherein each of the first opening and the second opening partially exposes the first first-type sensing electrode or the first second-type sensing electrode.

2. The touch sensor according to claim 1, wherein a position of the second opening overlaps a position of the first opening.

3. The touch sensor according to claim 1, wherein the first conductive member is spaced from each of the first opening and the second opening.

4. The touch sensor according to claim 1, wherein the sensing electrode set includes a transparent conductive material.

5. The touch sensor according to claim 1, wherein the first conductive member includes aluminum.

6. The touch sensor according to claim 1, wherein the first conductive member includes a first molybdenum layer, a second molybdenum layer, and an aluminum layer positioned between the first molybdenum layer and the second molybdenum layer.

7. The touch sensor according to claim 6, wherein the first conductive member further includes a transparent electrode material layer contacting with the first molybdenum layer and overlapping the first molybdenum layer.

8. The touch sensor according to claim 1, wherein the sensing electrode set comprises:
   a plurality of first-type sensing electrodes arranged in a first direction;
   a plurality of second-type sensing electrodes arranged in a second direction different from the first direction; and
   a first connection member electrically connecting at least two of the first-type sensing electrodes.

9. The touch sensor according to claim 8, wherein the first-type sensing electrodes, the second-type sensing electrodes, and the first connection member directly contact a same face of the base layer.

10. The touch sensor according to claim 8, wherein the first conductive member electrically connects the first second-type sensing electrode to a second second-type sensing electrode.

11. The touch sensor according to claim 10, wherein a second conductive member electrically connects the first second-type sensing electrode to the second second-type sensing electrode and overlaps a second first-type sensing electrode, and wherein the second first-type sensing electrode is electrically connected through the first connection member to the first first-type sensing electrode.

12. The touch sensor according to claim 10, wherein a second conductive member electrically connects the first second-type sensing electrode to the second second-type sensing electrode, overlaps the first first-type sensing electrode, and is positioned between the first opening and the first conductive member in a plan view.

13. The touch sensor according to claim 1, further comprising: a layer less conductive than the first conductive member and disposed in at least one of the first opening and the second opening.

14. A display device comprising:
   a display panel comprising a light emitting element and a sealing layer covering the light emitting element; and
   a touch sensor disposed on the display panel,
   wherein the touch sensor comprises:
   a sensing electrode set overlapping the sealing layer, comprising a first first-type sensing electrode, and comprising a first second-type sensing electrode;
   a first insulating layer disposed on the sensing electrode set, including a contact hole, and including a first opening;
   a first conductive member formed of a first material, disposed on the first insulating layer, and directly connected to the first second-type sensing electrode through the contact hole;
   a second insulating layer disposed on the first insulating layer, covering the first conductive member, and including a second opening; and
   a layer formed of a second material and disposed in at least one of the first opening and the second opening,
   wherein conductivity of the second material is lower than conductivity of the first material, and
   wherein each of the first opening and the second opening partially exposes the first first-type sensing electrode or the first second-type sensing electrode.

15. The display device according to claim 14, wherein a position of the second opening overlaps a position of the first opening.

16. The display device according to claim 14, wherein the first conductive member is spaced from each of the first opening and the second opening.

17. The display device according to claim 15, further comprising:
   an anti-reflection layer or a window layer disposed on the second insulating layer.

18. The display device according to claim 14, wherein the layer is a transparent adhesive member.

19. The display device according to claim 14, wherein the sensing electrode set includes a transparent conductive material.

20. The display device according to claim 19, wherein the first conductive member includes aluminum.

\* \* \* \* \*